(12) United States Patent
Rhee et al.

(10) Patent No.: US 9,544,235 B2
(45) Date of Patent: Jan. 10, 2017

(54) SCALING WIFI PERFORMANCE FOR LARGE-AUDIENCE ENVIRONMENTS VIA ACCESS POINTS

(71) Applicant: North Carolina State University, Raleigh, NC (US)

(72) Inventors: Injong Rhee, Raleigh, NC (US); Jeongki Min, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 90 days.

(21) Appl. No.: 14/517,488

(22) Filed: Oct. 17, 2014

(65) Prior Publication Data

US 2015/0109919 A1    Apr. 23, 2015

Related U.S. Application Data

(60) Provisional application No. 61/892,143, filed on Oct. 17, 2013.

(51) Int. Cl.
| | |
|---|---|
| H04L 1/00 | (2006.01) |
| H04L 12/801 | (2013.01) |
| H04W 72/12 | (2009.01) |
| H04W 84/12 | (2009.01) |
| H04L 12/803 | (2013.01) |

(52) U.S. Cl.
CPC ........ *H04L 47/193* (2013.01); *H04W 72/1252* (2013.01); *H04L 47/125* (2013.01); *H04W 84/12* (2013.01)

(58) Field of Classification Search
CPC .. H04L 47/125; H04W 72/1252; H04W 84/12
See application file for complete search history.

(56) References Cited

U.S. PATENT DOCUMENTS

| | | | | |
|---|---|---|---|---|
| 8,363,102 B1* | 1/2013 | Kadoch | ................... | H04N 7/18 348/148 |
| 2007/0121507 A1* | 5/2007 | Manzalini | ............... | H04L 47/10 370/235 |
| 2010/0203916 A1* | 8/2010 | Tiwari | ................. | H04B 7/0871 455/513 |
| 2011/0261831 A1* | 10/2011 | Sharma | .................. | H04L 47/17 370/412 |

(Continued)

OTHER PUBLICATIONS

DummyNet: http://info.iet.unipi.it/~luigi/dummynet/, webpage available as early as Jul. 14, 2009.

(Continued)

*Primary Examiner* — Abdelnabi O Musa
(74) *Attorney, Agent, or Firm* — Michael Best & Friedrich LLP (57) ABSTRACT

A network device connecting a client station with a TCP/IP server, the device includes a transmitter configured to transmit signals from at least one of the server and the client station, and a receiver configured to receive signals from at least one of the server and the client station. The device also includes a controller. The controller is configured to determine a priority level of the network device based on a dynamic traffic load of the network device, and assign a high priority setting to a first data packet received during a predetermined period of time. Duration of the predetermined period of time is based on the priority level of the network device.

21 Claims, 10 Drawing Sheets

(56) References Cited

U.S. PATENT DOCUMENTS

2013/0279334 A1* 10/2013 Xu .................. H04L 47/125
370/235

OTHER PUBLICATIONS

MADFIWI Project: http://madwifi-project.org/, webpage available as early as Nov. 10, 2008.
E. Aguilera, J. Casademont, J. Cotrina, and A. Rojas, Perf. enhancement of wlan IEEE 802.11 for asymmetric traffic. In IEEE PIMRC, 2005.
A. Aziz, J. Herzen, R. Merz, S. Shneer, and P. Thiran, Enhance &; explore: an adaptive algorithm to maximize the utility of wireless networks. In International Conference on Mobile computing and networking, MobiCom '11. ACM, 2011.
A. Babu, L. Jacob, and V. Brijith, A novel scheme for achieving time based in IEEE 802.11 multirate wireless LANs. In IEEE ICON, 2005.
A. Banchs, P. Serrano, and H. Oliver, Proportional fair throughput allocation in multirate IEEE 802.11 e wireless LANs. Wireless Networks, 2007.
P. Barford and M. Crovella, Generating representative Web workloads for network and server performance evaluation. In ACM SIGMETRICS Perform. Eval. Rev., 1998.
M. Belshe, More bandwidth doesn't matter (much), 2010.
R. Bruno, M. Conti, and E. Gregori, Design of and enhanced AP to optimize TCP perf. in Wi-Fi hotspot networks. Wirel. Netw., 2007.
M. Crovella and A. Bestavros, Self-Similarity in www Traffic: Evidence and Possible Causes. IEEE/ACM ToN, 5, 1997.
M. H. Franck, F. Rousseau, G. Berger-sabbatel, and A. Duda, Performance Anomaly of 802.11b. In IEEE INFOCOM, 2003.
S. Ha, L. Le, I. Rhee, and L. Xu, Impact of background traffic on performance of high-speed TCP variant protocols. Computer Networks, 2007.
N. Hedge, A. Proutiere, and J. Roberts. Evaluating the voice capacity of 802.11 wlan under distributed control. In Local and Metropolitan Area Networks, 2005. LANMAN 2005. The 14th IEEE Workshop on, pp. 6-pp. IEEE, 2005.
J. Jeong, S. Choi, and C. Kim, Achieving weighted fairness bw uplink and downlink in IEEE 802.11 DCF-based WLANs. In QShine, 2005.
L. B. Jiang and S. C. Liew, Proportional fairness in wireless LANs and ad hoc networks. In IEEE WCNC, 2005.
B. T. Kandula S., Lin K. and K. D. FatVAP: Aggregating AP Backhaul Capacity to Maximize Throughput. In USENIX NSDI, 2008.
F. Keceli, I. Inan, and E. Ayanoglu, Weighted Fair Uplink/Downlink Access Provisioning in IEEE 802.11 e WLANs. In IEEE ICC, 2008.
S. W. Kim, B. Kim, and Y. Fang, Downlink and uplink resource alloc. in IEEE 802.11 wlans. IEEE TVT, 2005.
S. Kopparty, S. Krishnamurthy, M. Faloutsos, and S. Tripathi, Split tcp for mobile ad hoc networks. In GLOBECOM, 2002.
G. Maier, A. Feldmann, V. Paxson, and M. Allman, On dominant characteristics of residential broadband internet traffic. In Internet Measurement Conference. ACM, 2009.
R. Murty, J. Padhye, R. Chandra, A. Wolman, and B. Zill, Designing high perf. enterprise wi-fi networks. In NSDI, 2008.
N. Nandiraju, H. Gossain, D. Cavalcanti, K. Chowdhury, and D. Agrawal, Achieving Fairness in Wireless LANs by Enhanced IEEE 802.11 DCF. In IEEE WiMob, 2006.
R. Raghavendra, E. Belding, K. Papagiannaki, and K. Almeroth, Unwanted link layer traffic in large IEEE 802.11 wireless networks. Mobile Computing, IEEE Transactions on, 9(9):1212-1225, Sep. 2010.
C. Raiciu, D. Niculescu, M. Bagnulo, and M. Handley, Opp. mobility with mptcp. In MobiArch, 2011.
K. K. Ramakrishnan, S. Floyd, and D. Black, The Addition of Explicit Congestion Notification (ENC) to IP, 2001.
S. Rayanchu, V. Shrivastava, S. Banerjee, and R. Chandra, Fluid: improving throughputs in enterprise wlans through flexible channelization. MobiCom '11, 2011.
M. Rodrig, C. Reis, R. Mahajan, D. Wetherall, and J. Zahorjan, Measr. based char. of 802.11 in a hotspot setting. in ACM E-Wind, 2005.
A. Schulman, D. Levin, and N. Spring, On the fidelity of 802.11 packet traces. In PAM 2008.
S. Shah and B. Noble, A study of e-mail patterns. Software, Practice & Practice, May 2007.
J. Shin, H. Roh, D. Lee, and S. Kim, Generalized proportional fair rate allocation schemes for IEEE 802.11e wireless LANs. In APCC, 2008.
S. Shin and H. Schulzrinne, Balancing uplink and downlink delay of VoIP traffic in WLANs using Adaptive Priority Control (APC). In ACM QShine, 2006.
H. Soroush, P. Gilbert, N. Banerjee, B. Levine, M. Corner, and L. Cox, Concurrent wi-fi for mobile users: analysis and measurements. In ACM CoNEXT 2011.
G. Tan and J. Guttag, Time-based fairness improves performance in multi-rate WLANs. In USENIX ATC, 2004.
I. Tinnirello and S. Choi, Temporal Fairness Provisioning in Multi-Rate Contention-Based 802.11e WLANs. In IEEE WoWMoM, 2005.
H. Velayos, I. Mas, and G. Karlsson, Overload protection for IEEE 802.11 cells. In Quality of Service, 2006. IWQoS 2006. 14th IEEE International Workshop on, 2006.
X. Wang and S. A. Mujtaba, Perf. enhancement of 802.11 wlan for asymm. traffic using an adaptive MAC layer protocol. In IEEE VTC, 2002.

* cited by examiner

| Class | CWmin | CWmax | AIFS | TXOPLimit |
|---|---|---|---|---|
| AP | 1 | 5 | 1 | 64 |
| STAs | 5 | 10 | N/A | N/A |

Priority Level : 5 (n=10)

AP access during this period gets high priority

AP access during this period gets low priority

FIG. 6B

Default
Priority 1
Priority 2
⋮
Priority 10

SCALING WIFI PERFORMANCE FOR LARGE-AUDIENCE ENVIRONMENTS VIA ACCESS POINTS

RELATED APPLICATIONS

This application claims priority to U.S. Provisional Patent Application No. 61/892,143 filed on Oct. 17, 2013, the entire contents of which are incorporated herein by reference.

STATEMENT REGARDING FEDERALLY SPONSORED RESEARCH OR DEVELOPMENT

This invention was made with government support under CNS-1016216 awarded by the National Science Foundation and under IIS-0910868 awarded by the National Science Foundation. The government has certain rights in the invention.

BACKGROUND

The present invention relates to wireless local area networks.

SUMMARY

Wireless local area networks (WLANs) are a common way to provide access to the Internet to various users. As the ownership and use of mobile devices such as, for example, smartphones, laptop computers, tablet computes, and personal multimedia devices equipped with wireless interfaces (e.g., WiFi interfaces) increase, WLANs are installed in more and more locations. WLANs use access points to connect to multiple client stations (i.e., mobile devices) and respond to requests for Internet access from the different client stations.

When access points are used to provide Internet access for large-audience environments (e.g., busy airports, large conventions, etc.), however, the connectivity and responsiveness of the local area network is greatly diminished due to the increased ratio of client stations to access points in a large-audience environment. When a single access point has to respond to requests from many different client stations, the access point struggles to provide and allocate the necessary communication resources to the client stations. The overhead (i.e., computer resources such as processing and memory) for handling high contentions, such as carrier sensing, back-off, and collisions increase significantly in large-audience environments.

Another problem often encountered in large-audience environments includes decreased transmission rates due to random losses and the use of the transmission control protocol (TCP). TCP is a commonly used transport protocol. TCP, however, is generally optimized for accurate delivery rather than timely delivery. Therefore, in large-audience environments, TCP can incur long delays while waiting for out-of-order data packets or retransmissions of data packets (also referred to as TCP retransmission) in an effort to send and receive accurate messages. When the TCP decreases its transmission rates, more channel resources are in use for a longer period of time, which augments the shortage of communication resources.

Figure 1:
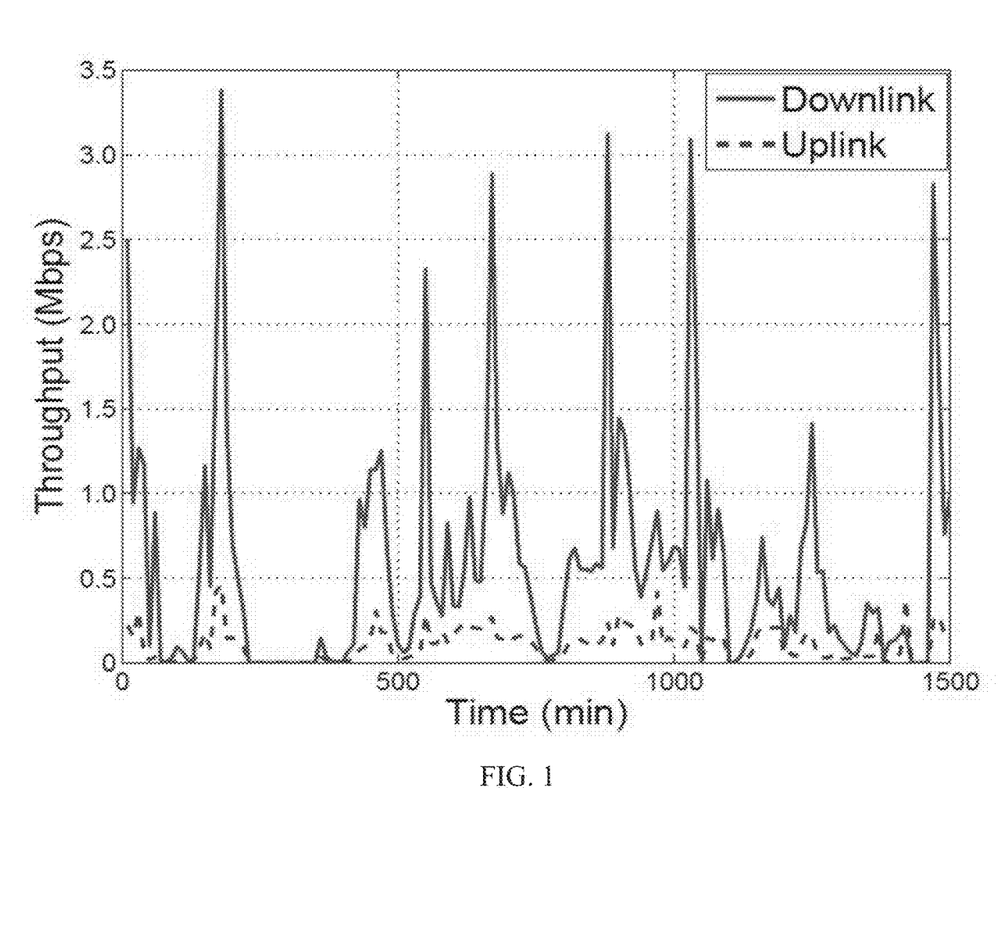
FIG. 1 graphically illustrates throughput for downlink and uplink traffic.
Figure 2:
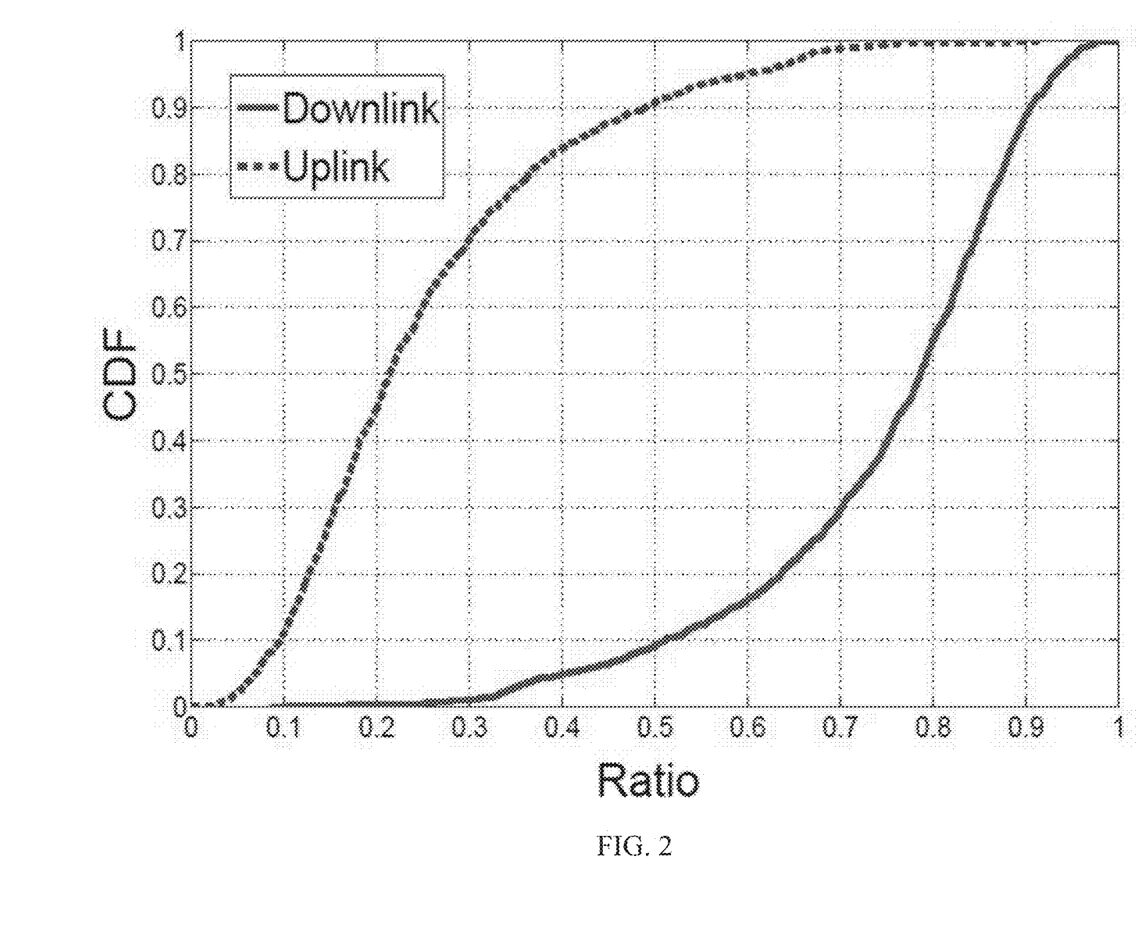
FIG. 2 graphically illustrates the cumulative distributive function (CDF) for downlink and uplink traffic.

Furthermore, traffic asymmetry intensifies the lack of connectivity and responsiveness from the access points. Traffic symmetry/asymmetry relates to the pattern of downlink traffic and uplink traffic. Typically, channels within an access point are evenly divided to provide approximately equal bandwidth for uplink traffic and downlink traffic. However, due to the large number of client stations in large-audience environments, the downlink traffic is much greater than the uplink traffic. FIG. 1 graphically illustrates the difference between uplink traffic and downlink traffic in large-audience environments. Similarly, FIG. 2 illustrates the cumulative distribution function (CDF) of the ratio of the uplink traffic over the total traffic and the CDF of the ratio of the downlink over the total traffic. As illustrated in FIG. 2, more than 90% of the traces have a ratio greater than 50% for downlink traffic. In other words, 90% of the time, downlink traffic is greater than uplink traffic in large-audience environments. When the number of associated client stations increases, the difference between downlink traffic and uplink traffic also increases. During this time, the access point may have channels that are designated for uplink traffic that are not optimally utilized and, at the same time, a downlink traffic bottleneck is created because the access point does not have sufficient channels designated for downlink traffic.

Due to these challenges, large-audience environments have been incapable of providing a user with acceptable Internet connectivity and responsiveness. In other words, as the number of client stations increases in a wireless network, the ratio of client stations experiencing network failure also increases.

Embodiments of the invention provide, among other things, improved Internet connectivity and responsiveness by adaptively designating channel resources from the access point. In one embodiment, the invention provides a network device connecting a client station with a TCP/IP server. The device includes a transmitter configured to transmit signals from at least one selected from the group of the server and the client station, and a receiver configured to receive signals from at least one selected from the group of the server and the client station. The device also includes a controller. The controller is configured to determine a priority level of the network device based on a dynamic traffic load of the network device, and assign a high priority setting to a data packet received during a predetermined period of time. Duration of the predetermined period of time is based on the priority level of the network device.

In another embodiment, the invention provides a method of dynamically allocating channels in an access point to client stations. The method includes determining a dynamic traffic load at the access point, and determining a priority level of the access point based on the dynamic traffic load at the access point. The method also includes receiving a first data packet at the access point, assigning a high priority setting to the first data packet based on the priority level of the access point, and changing the priority level of the access point in response to a change in the dynamic traffic load at the access point.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using a variety of means including direct connections, wired connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor," "central processing unit," and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in different forms, including parallel processors, serial processors, tandem processors or cloud processing/cloud computing configurations.

Figure 3:
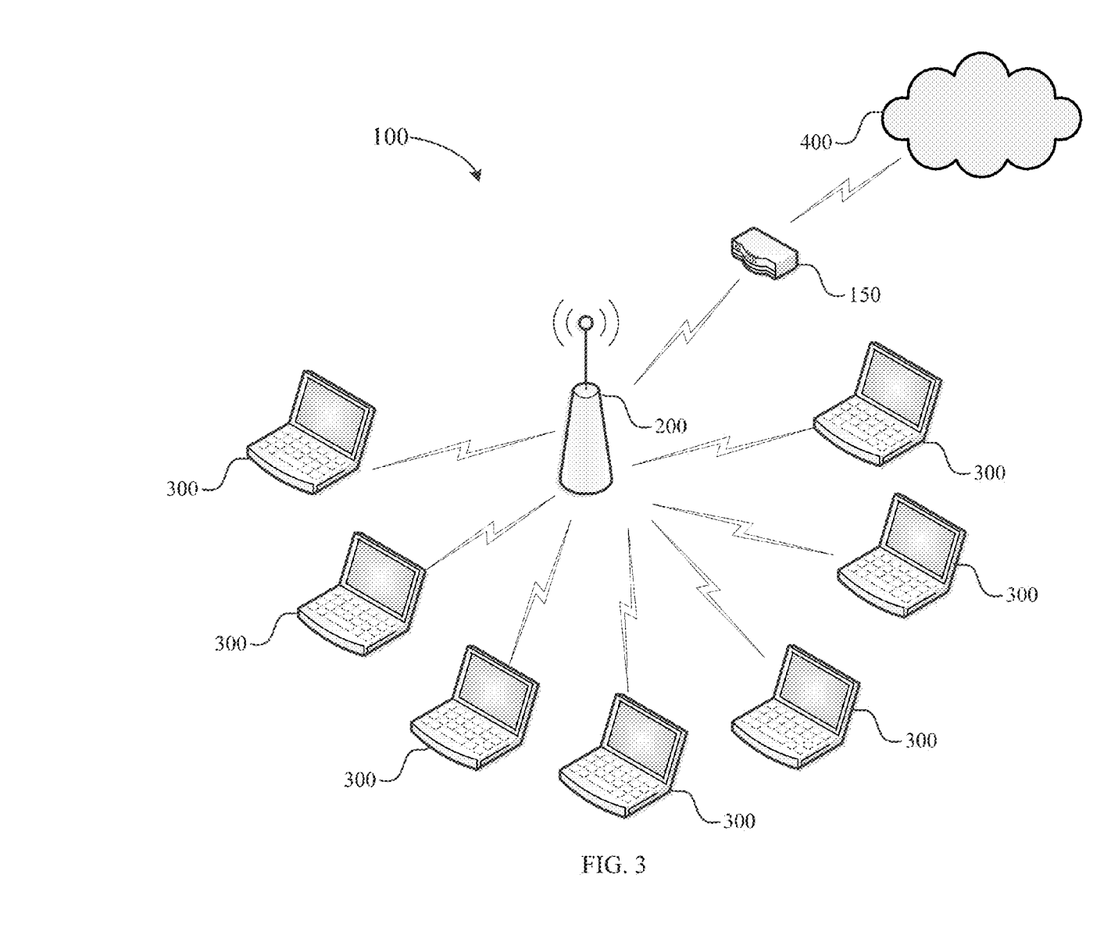
FIG. 3 illustrates a wireless local area network according to one embodiment of the invention.

FIG. 3 illustrates a wireless local area network (WLAN) 100 for providing Internet access to multiple client stations. The WLAN 100 may be, for example, an IEEE 802.11 compliant network. The WLAN 100 includes an access point 200 and a plurality of client stations 300. The WLAN 100 may also include a router 150, a number of switches, and a hub. These components may communicate via separate communication links. In the illustrated embodiment, the router 150 hosts software and related tools connected over a connection, such as a TCP/IP connection. Therefore, the router 150 connects the access point 200 to a remote server 400 (e.g., the Internet or a specific server or server network).

The access point 200 directs the uplink and downlink traffic from the client stations 300 and connects the client stations 300 to a remote server 400.

The server 400 may include one or a group of servers. For example, the server 400 may include a web server, a mail server, and/or another server typically used to provide Internet access to client stations. The server 400 may also include a file server and/or another server typically used to provide network access to client stations 300 using a TCP/IP connection.

Figure 4:
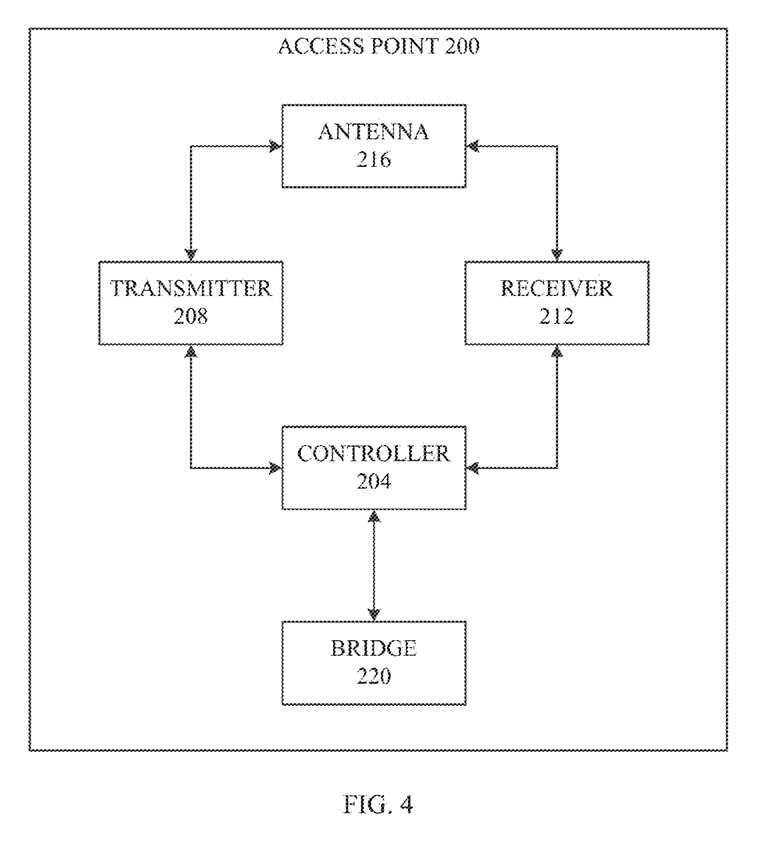
FIG. 4 illustrates an access point of the wireless local area network shown in FIG. 3.

In the illustrated embodiment, the access point (AP) 200 is a wireless base station that is mounted in a fixed position. Each access point 200 allows client stations 300 within a certain perimeter of the access point 200 to communicate with the remote server 400. As shown in FIG. 4, the access point 200 includes a controller 204, a transmitter 208, a receiver 212, an antenna 216, and a bridge 220. The bridge 220 routes data packets to and from the server 400 as appropriate. In some embodiments, the transmitter 208 and the receiver 212 may be combined into a single component (e.g., a transceiver). The transmitter 208, the receiver 212, and the antenna 216 utilize communication schemes and/or protocols for transmitting signals between the client stations 300 and the access point 200.

The communication schemes may be contention-oriented, such as the IEEE 802.11 protocol, such that all the client stations 300 in the environment may share the limited bandwidth access point 200. Therefore, as the number of client stations 300 increases within a given area, the limited bandwidth provided by the access point 200 is more highly contended. Signal interference between different access points 200 can also degrade connectivity between the client stations 300 and the server 400. The controller 204 implements models and protocols to ensure the correct and timely transmission of data packets to and from the client stations 300.

The client stations 300 include any electronic device equipped with a wireless interface. For example, the client stations 300 include mobile devices including WiFi interfaces such as smartphone, laptop computers, tablet computers, smartwatches, personal multimedia devices, and the like. In some embodiments, the client stations 300 can include a network adapter. The client stations 300 communicate with the access point 200 to gain access to the server 400. Each client station 300 includes a controller, a transmitter, a receiver, an antenna, and hardware to provide a data interface between the client station 300 and the access point 200.

As discussed above, communication channels in an access point 200 are typically evenly (or approximately evenly) distributed for uplink and downlink traffic. To cope with problems typical of large-audience environments, and in particular reduce the effects of traffic asymmetry, the access point 200 implements an adaptive priority control. The adaptive priority control prioritizes the downlink requests from the access point 200 and adaptively allocates the channel resources to reduce the contention for the limited channel resources.

To implement the adaptive priority control, the access point 200 first defines a setting of the Media Access Control layer (MAC) parameters that assigns the highest priority for the access point 200. When using IEEE 802.11, the MAC generally has the following four parameters available from software WLAN drivers: a minimum contention window size, a maximum contention window size, a transmission opportunity limit, and inter-frame spaces. The minimum contention window size is defined as the lower limit for a back-off timer, while the maximum contention window size is defined as the upper limit for the back-off timer. The transmission opportunity limit is defined as the maximum duration that a node can transmit without contending for the wireless channel with short inter-frame space (SIFS). If, for example, two communication requests are assigned different values for each of these parameters, it may be difficult to determine which communication request is more likely to obtain the communication channel faster.

Figure 5:
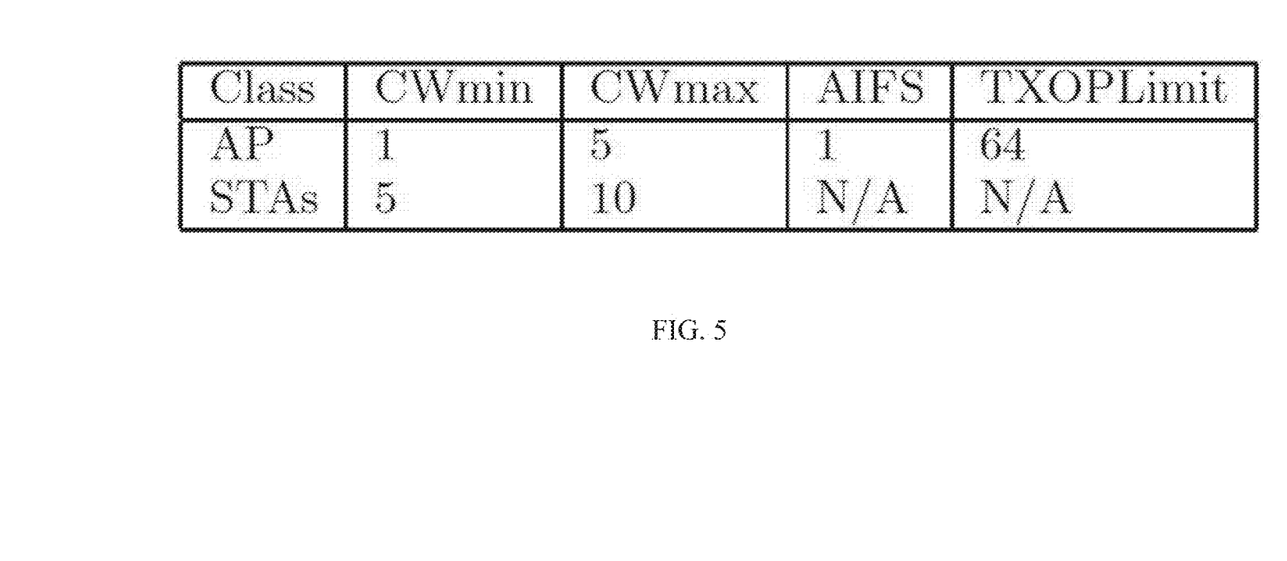
FIG. 5 is a table illustrating the parameter values for priority settings implemented by the access point shown in FIG. 4.

The adaptive priority control predefines priority settings that specify a value for each of the parameters discussed above. A high priority setting has comparatively higher possibilities of securing a communication channel faster. The access point 200 defines a HIGH priority setting and a DEFAULT priority setting. The specific values associated with the parameters discussed above for the HIGH priority setting and the DEFAULT priority setting are shown in the table of FIG. 5. In the table of FIG. 5, the row labeled AP indicates the parameter values for the HIGH priority setting, and the row labeled STAs indicates the parameter values for the DEFAULT priority setting. Other settings can be used and/or other labels/flags can be assigned to the priority settings.

The access point 200 then assigns communication requests either a HIGH priority setting or a DEFAULT priority setting. When a communication request is assigned the HIGH priority setting, the communication request has an advantage and gains access to a communication channel faster than a communication request assigned the DEFAULT priority setting. By defining the priority setting, the access point 200 enables at least some of the downlink requests to have an advantage when contending for communication channels.

The access point 200 determines which and how many downlink requests are assigned the HIGH priority setting based on a priority level determined for the access point 200. The priority level is an indirect indication of the overload present at the access point 200. In other words, the priority level is a measure of the bottleneck effect (or the start of the bottleneck effect) when traffic asymmetry begins to negatively affect connectivity and/or responsiveness in the network 100. Therefore, when implementing the adaptive priority control, the severity of traffic asymmetry is inferred, preferably under timing constraints that data or information is processed at the same or nearly the same rate as it is received (i.e., in real time). When the access point 200 determines that the traffic asymmetry is negatively affecting the connectivity and responsiveness of the WLAN 100 (i.e., the downlink traffic is causing a bottleneck while channel resources reserved for uplink traffic are not being optimally utilized), the access point 200 begins to prioritize downlink requests from the access point 200. The adaptive priority control prioritizes access point 200 requests for channel resource access over competing client stations 300.

The priority level of the access point 200 is determined based, at least in part, on a dynamic traffic load at the access point 200. Therefore, to determine the priority level of the access point 200 and thereby determine which and how many downlink requests are assigned the HIGH priority setting, the access point 200 first determines the dynamic traffic load at the access point 200. The dynamic traffic load gives an indication of the number of requests received by the access point 200 and gives a relative measure regarding how overloaded the access point is at the current time. Increases in the dynamic traffic load signify that the downlink requests are increasing. When the downlink requests increase due, for instance, to the number of client stations 300 coupled to the access point 200, the priority level determined for the access point 200 increases. Also, as the dynamic traffic load at the access point 200 increases, the priority level of the access point 200 increases, which leads the access point 200 to assign a HIGH priority setting for more downlink requests, thereby allocating more communication resources (i.e., communication channels) for downlink traffic, which relieves some of the contention for the communication channels. When enough contention is relieved (i.e., when the downlink traffic is not significantly more than the downlink traffic), the access point 200 detects that the dynamic traffic load decreased. Once the access point 200 detects a decrease in the dynamic traffic load, the priority level of the access point 200 also decreases, which restores the symmetric (or nearly symmetric) allocation of communication channels in the access point 200. In other words, the priority level of the access point 200 changes in proportion to the dynamic traffic load at the access point 200.

In this manner, at low load (i.e., only a few client station 300 communicating with the access point 200), the client stations 300 receive an equal opportunity as the access point 200 to transmit communication requests. As the load increases (i.e., the number of downlink requests at the access point 200), the access point 200 has a higher access priority proportional to the amount of downlink traffic, which allows the downlink requests to be addressed more efficiently. The dynamic downlink traffic load at the access point 200 is reliably estimated by determining the instantaneous transmission queue size (Q) of the access point 200. The instantaneous transmission queue size is limited to a maximum queue size by an upper bound, $Q_{max}$. Therefore, when the access point 200 implements the adaptive priority control, the access point 200 determines the instantaneous transmission queue size (Q) at the access point 200. The access point 200 then determines a priority level for the access point 200 based on the instantaneous transmission queue size (Q).

In the illustrated embodiment, the priority levels are established such that the access point 200 is at the lowest priority level when the transmission queue size is zero, and the access point 200 is at the highest priority level when the transmission queue size is at the maximum transmission queue size ($Q_{max}$). Additionally, the priority levels are established such that the priority levels increase monotonically as the transmission queue size increases. Since transmission queue size provides an indirect measurement of the dynamic traffic load at the access point 200, which is an indirect measure of the traffic asymmetry in the system 100, the priority levels are determined based on the difference in downlink communication requests and uplink communication requests. In other embodiments, other factors may be considered when determining the dynamic traffic load of the access point 200. A combination of different factors could also be used to determine the dynamic downlink traffic.

Figure 6A:
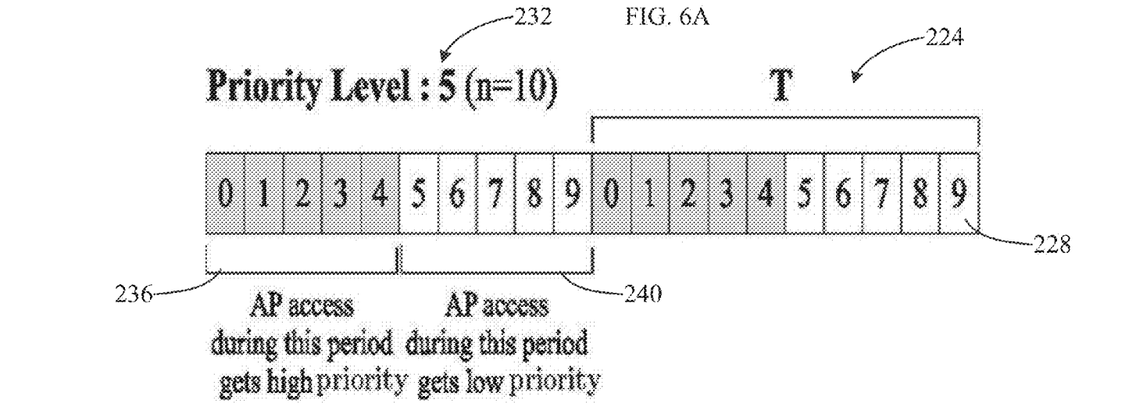
FIGS. 6A-6B illustrate a structure of priority levels implemented by the access point.

FIG. 6A illustrates the way in which the priority levels are structured. First, the channel time for the access point 200 is divided into continuous intervals of time T 224. Each interval of time T is further divided into n slots 228 of duration T/n. The access point 200 is assigned a priority level k 232. The priority level k 232 determines how many of the n slots 228 will be considered high priority slots 236 (shaded in FIGS. 6A and 6B). Downlink requests from the access point 200 that are received during a high priority slot 236 are assigned the HIGH priority setting. Therefore, the lower the priority level 232 determined for the access point 200, the less downlink requests that will be assigned the HIGH priority setting. Analogously, the higher the priority level 232 determined for the access point 200, the more downlink requests that will be assigned the HIGH priority setting, and the more communication channels that will be allocated to the access point 200 downlink requests.

Figure 6B:
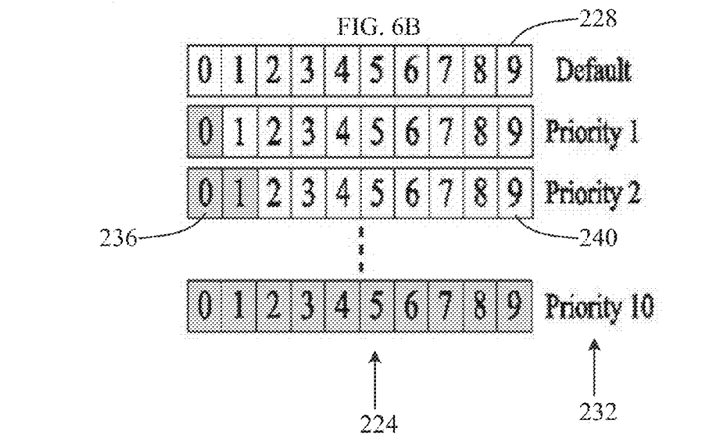

In other words, if the number of n slots 228 is greater than the priority level k 232, the number of high priority slots 236 is reduced to match the priority level k 232. If the current number of high priority slots 236 is less than the priority level k 232, the number of high priority slots 236 are increased to match the priority level k 232. Therefore, different priority levels 232 are established based on the number of high priority slots 236 compared to the number of low priority slots 240 (e.g., the ratio of high priority slots 236 to low priority slots 240). As illustrated in FIG. 6B, the greater the priority level 232, the more high priority slots 236, which allows more downlink requests from the access point 200 to be assigned the HIGH priority setting and gain communication channels faster. The priority level scheme supports a linear scaling property where the average throughput of the high priority node increases in linear proportion to its priority level.

Figure 7:
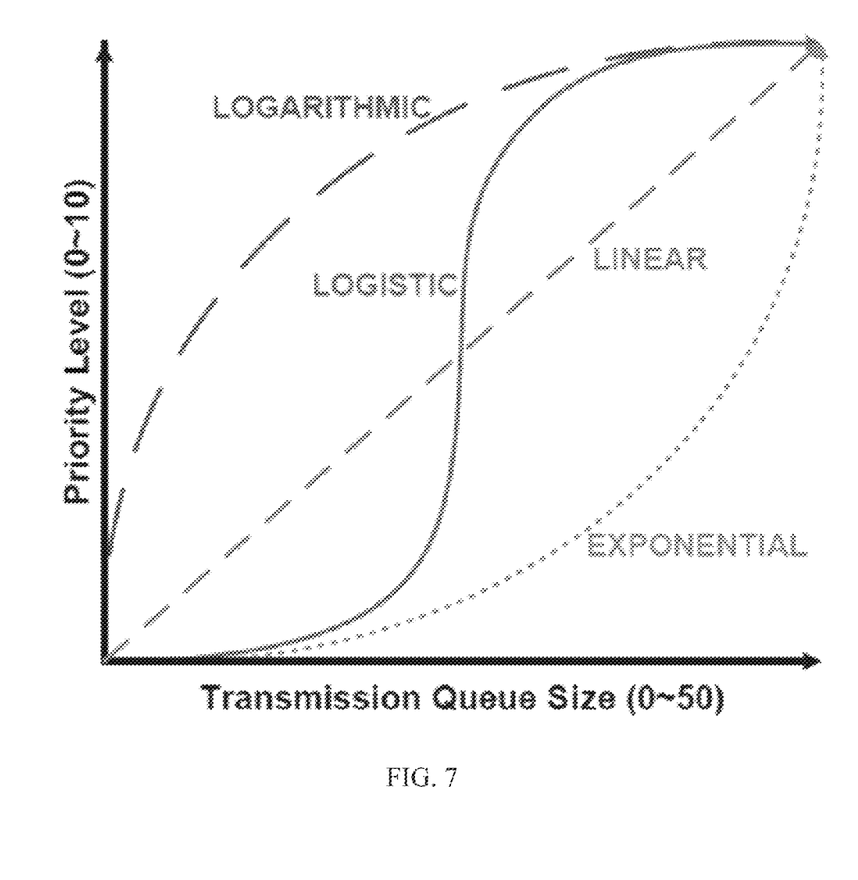
FIG. 7 illustrates various control functions for an adaptive priority control implemented by the access point.

As already explained, the priority level of the access point 200 increases monotonically with respect to the transmission queue size. However, the access point 200 can implement different monotonically increasing functions to control the priority levels of the access point 200. As illustrated in FIG. 7, different types of monotonically increasing functions can be implemented to control the priority level determined for the access point 200 based on the transmission queue size. Different control functions, including the ones shown in FIG. 7 and those not shown in FIG. 7, can be implemented depending on the particular situation and the desired outcomes. In one example, a logarithmic function is implemented to control the priority levels. The logarithmic function causes the priority level to rapidly increase for a small increase in lower queue sizes. The increase rate of priority level decreases as the queue size approaches the maximum queue size. In other words, the logarithmic priority control maintains downlink priority unless the queue size becomes too small.

In another example, an exponential function is implemented to control change of the priority levels. The exponential function provides an exponential growth of the priority level at higher queue sizes. The exponential function causes the priority level to rapidly decrease as the transmission queue size begins to decrease. The exponential function control provides less bandwidth to downlink traffic for medium and small queue sizes.

In another example, a linear function is implemented to control the priority levels. The linear function balances the downlink and the uplink proportionately. Therefore, the linear priority control provides no aggressive priority level increase and no aggressive priority level decrease.

In another example, a logistic function is implemented to control change of the priority levels. The logistic function provides a combinational priority control of the exponential growth and the logarithmic reduction in middle level queue sizes. The logistic priority control resembles a threshold control, since it changes the priority control based upon a predetermined level. In other words, when queue sizes are below a certain size, the priority level quickly decreases and when the queue sizes are above a certain threshold, the priority level quickly increases.

The adaptive priority control (i.e., the access point 200) can implement any one of the logarithmic, exponential, linear, and logistic control functions. Similarly, the adaptive priority control can implement a different function to vary the priority level based on the queue sizes.

Figure 8:
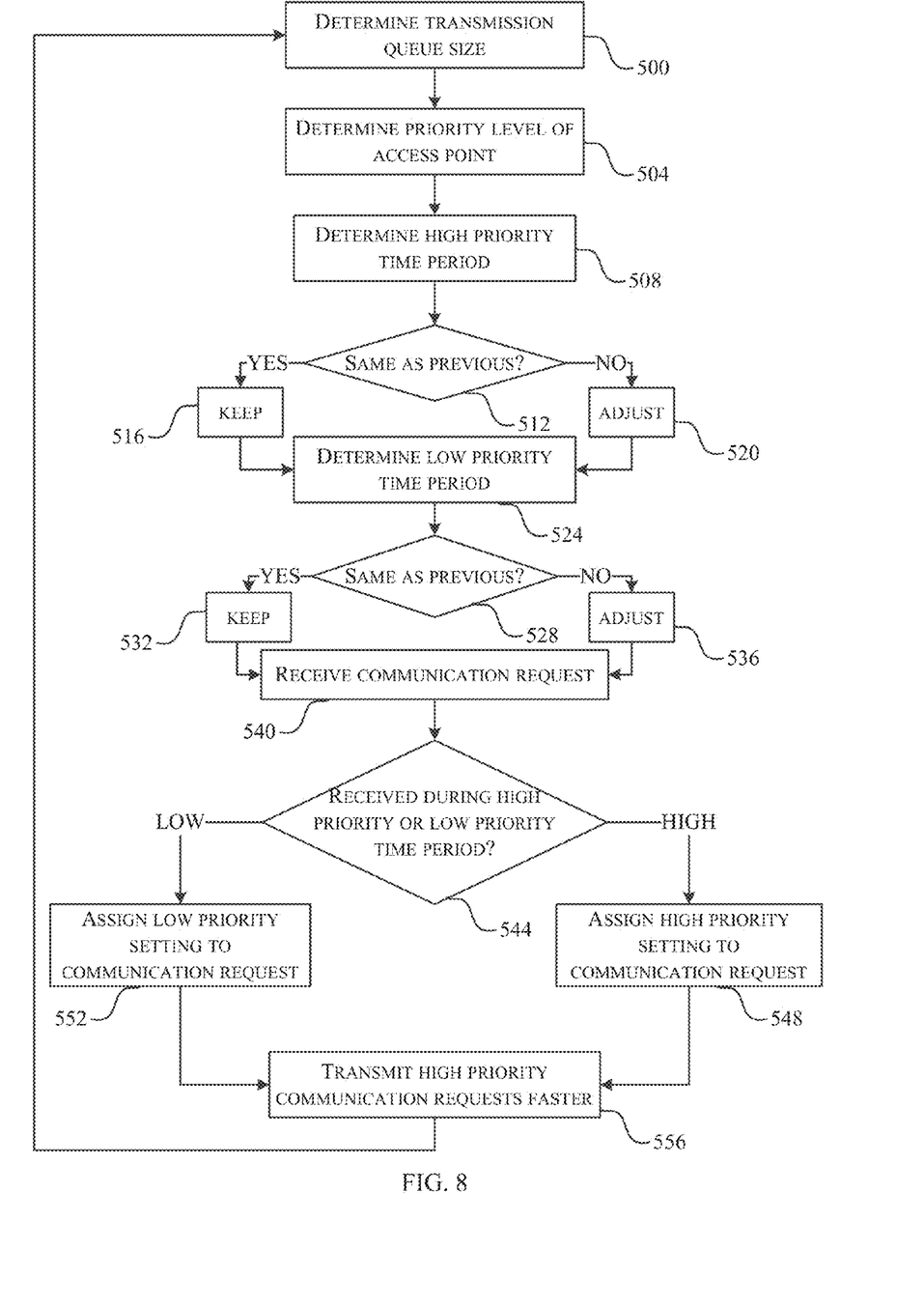
FIG. 8 is a flowchart illustrating a method of operation of the access point.

FIG. 8 illustrates a method of operation of the access point 200. The access point 200 monitors the dynamic traffic load at the access point 200 by determining the transmission queue size at the access point 200 (step 500). As discussed above, the transmission queue size provides an indirect measurement of the dynamic traffic load at the access point 200. The access point 200 then determines the priority level 232 of the access point based on the transmission queue size and a control function implemented by the access point 200 (step 504). The access point 200 then determines a duration of the high priority period of time based on the priority level 232 of the access point (step 508). The priority level 232 determines how many high priority slots 236 and how many low priority slots 240 are available within a continuous period of time T 224. Each of the high priority slots 236 and low priority slots 240 define specific predetermined time periods or time slots. In other words, a high priority time period is determined based on the priority level of the access point 200. The high priority time period is equivalent to the duration of the high priority slots 236.

The access point 200 then determines whether the high priority time period is the same, or substantially the same as the high priority time period determined during the previous cycle (step 512). If the high priority time period is substantially the same as the previous high priority time period, the access point 200 keeps the value for the high priority time period in step 516. If, on the other hand, the high priority time period is different than the previous high priority time period, the access point 200 adjusts the value for the high priority time period as necessary (step 520). Adjusting the high priority time period illustrates that the priority level of the access point 200 changes dynamically according to the transmission queue size.

The access point 200 also determines the duration of a low priority time period (step 524). The low priority time period is equivalent to the duration of the low priority slots 240 (see FIG. 6), and is also inversely indicative of the priority level of the access point 200. The access point 200 also compares the low priority time period to the previous low priority time period (step 528). If the low priority time period is substantially the same as the previous low priority time period, the access point 200 keeps the value for the low priority time period (step 532). However, if the low priority time period is different than the previous low priority time period, the access point 200 adjusts the low priority time period as necessary (step 536).

When the access point 200 receives a communication request at step 540, the access point 200 determines whether the communication request was received during the low priority time period or the high priority time period (step 544). If the communication request was received during the high priority time period, the access point 200 assigns the HIGH priority setting to the communication request (step 548). On the other hand, if the communication request is received during the low priority time period, the access point 200 assigns the DEFAULT (or LOW) priority setting to the communication request (step 552). The access point 200 then transmits high priority communication requests faster by allocating a proportionate amount of communication channels to high priority communications (step 556). The access point 200 continues to monitor the dynamic traffic load and adaptively allocating communication channels.

Figure 9:
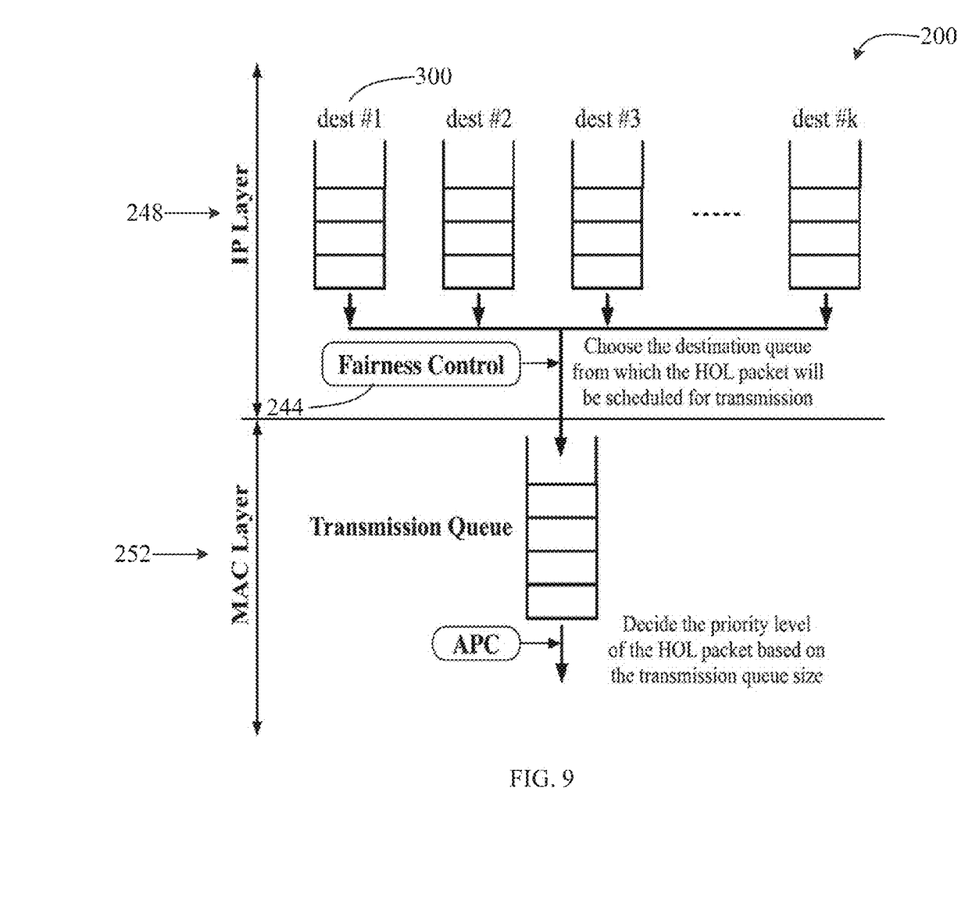
FIG. 9 illustrates the structure of a fairness control implemented by the access point.

As shown in FIG. 9, the access point 200 also includes an access point-only fairness framework. During times of heavy downlink traffic, the access point 200 assigns a high priority level to the access point downlink requests. Thus, the access point downlink requests will have higher priority over the uplink requests from the client stations 300. Therefore, channel time allocation asymptotically follows the access point-only fairness control. The framework allows a user to implement a specific fairness control algorithm for specific situations. The framework allows the access point-only fairness algorithm to be implemented as a kernel module 244 of the access point 200. The kernel module functions in an IP layer 248 just above a MAC layer 252 of the access point 200. Since the fairness algorithm is implemented as a kernel module 244 and kernel modules are easily modified, a different algorithm can easily be implemented.

The fairness module 244 contains a separate transmission queue for each active client station 300. The module 244 also includes architecture to capture outgoing data packets, for example a Netfilter POST ROUTING hook, before the data packets reach the MAC layer 252. If the captured packets are destined for the wireless interface, the packets are organized and enqueued based on their destination. By using a POST-ROUTING hook, or similar mechanism, TCP data packets are filtered and queued in appropriate destination queues while all other data packets traverse directly to the access point 200. Therefore, the network stack traversal of other packets is not affected and the WLAN 100 can support functionalities such as pure link layer forwarding. Usage of Netfilter hooks is not limiting to the scalability of the WLAN 100 since the Netfilter hooks can be efficiently embedded with a basic routing module itself for the access point 200.

Depending on the specific situation, different fairness control algorithms may be implemented. In one embodiment, a time fairness algorithm is implemented. The time fairness kernel module 244 maintains a channel occupancy time table of which entries maintain exponentially weighted moving averages of channel occupancy time for all currently held destination queues. The fairness module 244 monitors the instantaneous transmission queue size. If space is available, a non-empty queue with minimum channel occupancy time is chosen and a data packet is sent from that queue. If two or more queues have approximately the same minimum channel occupancy time, one queue is selected randomly. The channel occupancy time of a transmitted packet is computed based on its size and an estimate of the current data rate. The channel occupancy times of all the queues are periodically updated by taking a moving average with the total channel occupancy time of transmitted packets since the last update.

The performance of the fairness control can be measured with a Proportional Fairness Index (PFIndex), which is defined by Equation 1 below:

$$PF = \frac{\sum_{i=1}^{N} X_i \log X_i}{N}$$

In Equation 1, $X_i$ is the goodput of node $i \in [1,N]$ and N is the number of client stations 300.

In other embodiments, a different fairness algorithm is implemented. For example, the access point 200 can implement a different proportional fairness algorithm. The proportional fairness algorithm adjusts specific variables to adjust the balance between serving the client stations 300 with shorter transmission times (i.e., client stations 300 having better channel conditions) more often and serving the client stations 300 with longer transmission times (i.e., client stations 300 with below average channel conditions) often enough that they have an acceptable level of performance. Other fairness algorithms can be implemented depending on a particular situation and sets of parameters.

The access point 200 also includes a TCP proxy/ECN (explicit congestion notification; a congestion avoidance signaling mechanism) to address the problems of TCP performance for large-audience environments. In the past, ECN has been effective at communicating to a client station 300 that a data packet was not sent due to congestion. ECN allows end-to-end notification of network congestion without dropping packets. However, ECN is only effective when both endpoints (i.e., a client station 300 and the access point 200) support ECN. To enable ECN on the access point 200, the MAC driver and TCP stack in the access point 200 are configured to send congestion notifications to the server 400 with acknowledgements from the client stations 300 when an instantaneous transmission queue (TxQ) exceeds a predetermined threshold. Enabling ECN allows for better indication of the conditions at the access point 200.

Figure 10:
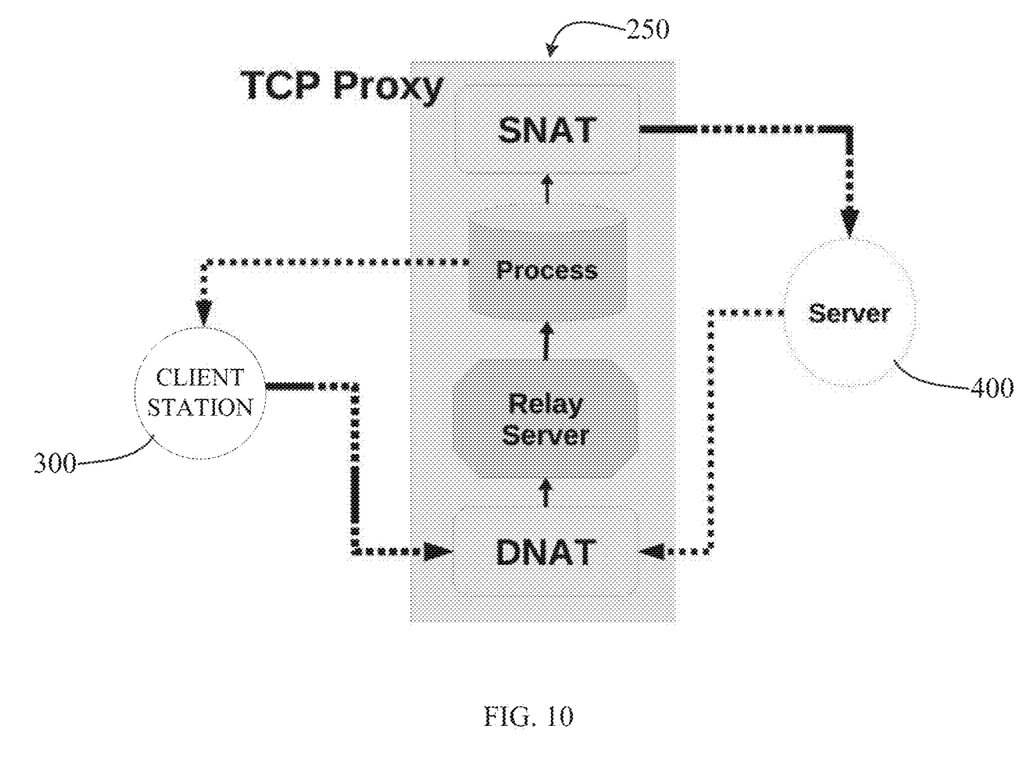
FIG. 10 shows the general set up of a TCP proxy included in the wireless local area network shown in FIG. 3.

In general, the TCP Proxy 250 filters requests and response streams. The TCP proxy 250 may be implemented at the access point 200 using IPtables and NAT (network address translation) to correctly route data packets to and from the client stations 300. The TCP proxy 250 avoids further performance degradation by virtually bringing a server 400 closer to the client station 300. As illustrated in FIG. 10, the TCP proxy 250 receives all requests from the client stations 300 as a virtual server and transmits new requests as a virtual client to real server 400 (i.e., Internet servers).

Therefore, among other things, certain embodiments of the access point 200 (or network device) described and illustrated implement a TCP proxy/ECN and access point-only fairness control with adaptive priority control. The WLAN 100 dynamically prioritizes the access point 200 over client stations 300 and avoids or reduces queue saturation and packet losses due to buffer overflow and increased contention. The adaptive priority control results in reduced contention and allows the TCP retransmission rate to remain relatively unaffected by the increased number of associated client stations. Further, the WLAN 100 continues to serve TCP requests, even when a high level of background traffic is present. The WLAN 100 ensures that downlink airtime is fairly shared among all client stations 300 avoiding unfairness due to bulk download. With prioritization, the access point 200 has increased access to channel resources and ensures effective realization of access point-only fairness schemes.

Thus, the invention provides, among other things, a scheme for allocation of equal channel occupancy time to multiple client stations to improve the aggregate throughput in infrastructure networks. Various features and advantages of the invention are set forth in the following claims.

The invention claimed is:

1. A network device connecting a client station with a TCP/IP server, the device comprising:
 a receiver configured to receive a data packet from at least one selected from a group consisting of the server and the client station;
 a controller coupled to the receiver and configured to determine a priority level of the network device based on a dynamic traffic load of the network device,
  wherein the controller is configured to determine the priority level of the network device from a set of priority levels that increase as the dynamic traffic load of the network device increases, assign a high priority setting to the data packet when the data packet is received, by the network device, during a predetermined period of time, and change the priority level of the network device in response to a change in the dynamic traffic load at the network device;

wherein a duration of the predetermined period of time is based on the priority level of the network device; and a transmitter coupled to the controller and configured to transmit the data packet from the network device to at least one selected from the group consisting of the server and the client station.

2. The network device of claim 1, wherein the data packet is a first data packet and the predetermined period of time is a first predetermined period of time, and wherein the controller is further configured to assign a low priority setting to a second data packet received during a second predetermined period of time.

3. The network device of claim 1, wherein the second predetermined period of time is based on the priority level of the network device, and wherein the first predetermined period of time is inversely proportional to the second period of time.

4. The network device of claim 1, wherein the controller is further configured to allocate transmission channels to the first data packet faster than to the second data packet.

5. The network device of claim 1, wherein the set of priority levels increase linearly in relation to the dynamic traffic load of the network device.

6. The network device of claim 1, wherein the set of priority levels increase logarithmically as the dynamic traffic load of the network device increases.

7. The network device of claim 1, wherein the set of priority levels increase logistically with respect to an increase of the dynamic traffic load of the network device.

8. The network device of claim 1, wherein the set of priority levels increase exponentially with respect to a dynamic traffic load increase of the network device.

9. The network device of claim 1, wherein the controller is further configured to determine the dynamic traffic load of the network device based on an instantaneous transmission queue size at the network device.

10. The network device of claim 9, wherein an instantaneous transmission queue size of zero corresponds to a lowest priority level and a maximum instantaneous transmission queue size corresponds to a highest priority level.

11. The network device of claim 1, wherein the controller is configured to determine the priority level of the network device from a set of monotonically increasing priority levels.

12. The network device of claim 1, wherein the controller is further configured to implement a network device-only fairness control.

13. The network device of claim 1, wherein the controller is further configured to send a notification to the server when the instantaneous transmission queue exceeds a predetermined threshold.

14. A method of dynamically allocating channels in an access point to client stations, the method comprising:

determining a dynamic traffic load at the access point;

determining a priority level of the access point based on the dynamic traffic load at the access point, wherein determining the priority level of the access point includes determining the priority level of the access point from a set of priority levels that increase as the dynamic traffic load of the access point increases;

receiving a first data packet at the access point from at least one selected from a group consisting of a server and the client stations;

assigning a high priority setting to the first data packet when the first data packet is received, the access point, during a predetermined period of time, wherein a duration of the predetermined period of time is based on the priority level of the access point;

transmitting the first data packet from the access point to at least one selected from the group consisting of the server and the client stations; and changing the priority level of the access point in response to a change in the dynamic traffic load at the access point.

15. The method of claim 14, wherein determining a dynamic traffic load includes determining an instantaneous transmission queue size at the access point.

16. The method of claim 14, wherein changing the priority level of the access point in response to the change in the dynamic traffic load at the access point includes increasing the priority level of the access point if the dynamic traffic load at the access point increases, and decreasing the priority level of the access point if the dynamic traffic load decreases.

17. The method of claim 14, wherein receiving a first data packet includes receiving the first data packet during a first predetermined time period, and further comprising:

determining a duration of the first predetermined time period based on the priority level of the access point.

18. The method of claim 17, further comprising:

determining a duration of a second predetermined time period based on the priority level of the access point;

receiving a second data packet during the second predetermined time period;

assigning a low priority setting to the second data packet; and allocating a transmission channel to the first data packet faster than the second data packet.

19. The method of claim 18, further comprising adjusting the duration of the first predetermined time period and the second predetermined time period in response to the change in priority level of the access point, wherein adjusting the duration of the first predetermined time period and the second predetermined time period includes increasing the duration of the first predetermined time period and decreasing the duration of the second predetermined time period when the priority level of the access point increases.

20. The method of claim 14, further comprising implementing an access point-only fairness control.

21. The method of claim 14, further comprising implementing a TCP proxy at the access point.

* * * * *